United States Patent
Fukuchi et al.

(10) Patent No.: US 12,269,470 B2
(45) Date of Patent: Apr. 8, 2025

(54) DRIVING ASSISTANCE DEVICE, DRIVING ASSISTANCE METHOD, AND PROGRAM

(71) Applicant: TOYOTA JIDOSHA KABUSHIKI KAISHA, Toyota (JP)

(72) Inventors: Nobuaki Fukuchi, Numazu (JP); Daiki Yasui, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 18/171,753

(22) Filed: Feb. 21, 2023

(65) Prior Publication Data

US 2023/0311862 A1 Oct. 5, 2023

(30) Foreign Application Priority Data

Mar. 31, 2022 (JP) ................ 2022-058189

(51) Int. Cl.
*B60W 30/09* (2012.01)
*B60W 10/20* (2006.01)
*B60W 30/095* (2012.01)
*B60W 50/08* (2020.01)

(52) U.S. Cl.
CPC ............ *B60W 30/09* (2013.01); *B60W 10/20* (2013.01); *B60W 30/0956* (2013.01); *B60W 50/08* (2013.01); *B60W 2510/202* (2013.01); *B60W 2540/18* (2013.01)

(58) Field of Classification Search
CPC .. B60W 30/09; B60W 10/20; B60W 30/0956; B60W 50/08; B60W 2510/202; B60W 2540/18; B62D 15/0265; B62D 6/002
See application file for complete search history.

(56) References Cited

U.S. PATENT DOCUMENTS

| 6,571,176 | B1 * | 5/2003 | Shinmura .......... B62D 15/0265 340/436 |
| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |

(Continued)

FOREIGN PATENT DOCUMENTS

JP  2004-256076 A  9/2004

*Primary Examiner* — Yufeng Zhang
(74) *Attorney, Agent, or Firm* — Sughrue Mion, PLLC

(57) ABSTRACT

To increase steering angle followability of automatic steering, provided is a driving assistance device for executing collision avoidance control of controlling a steering angle of an own vehicle such that the own vehicle travels along a target trajectory which enables the own vehicle to avoid a collision with an obstacle. The driving assistance device includes: a setting unit configured to set a target steering angle, and to set a target steering torque for matching the steering angle with the target steering angle; a cancellation unit configured to set a cancellation torque which cancels a total steering torque obtained by summing a driver steering torque and a steering assist torque set based on the driver steering torque; and a control unit configured to execute steering control of controlling the steering angle based on a torque control amount obtained by adding the target steering torque to the cancellation torque.

9 Claims, 11 Drawing Sheets

(56) References Cited

U.S. PATENT DOCUMENTS

| | | |
|---|---|---|
| 2009/0024278 A1 | 1/2009 | Kondo et al. |
| 2020/0241539 A1 | 7/2020 | Ozawa et al. |
| 2021/0061309 A1 | 3/2021 | Kawanai |
| 2021/0107521 A1 | 4/2021 | Fujita et al. |
| 2021/0107528 A1 | 4/2021 | Fujita et al. |
| 2021/0146956 A1 | 5/2021 | Fujita et al. |
| 2021/0146958 A1 | 5/2021 | Tanaka et al. |
| 2022/0017145 A1 | 1/2022 | Yasui et al. |
| 2023/0059106 A1* | 2/2023 | Takahashi ................ B62D 6/00 |

* cited by examiner

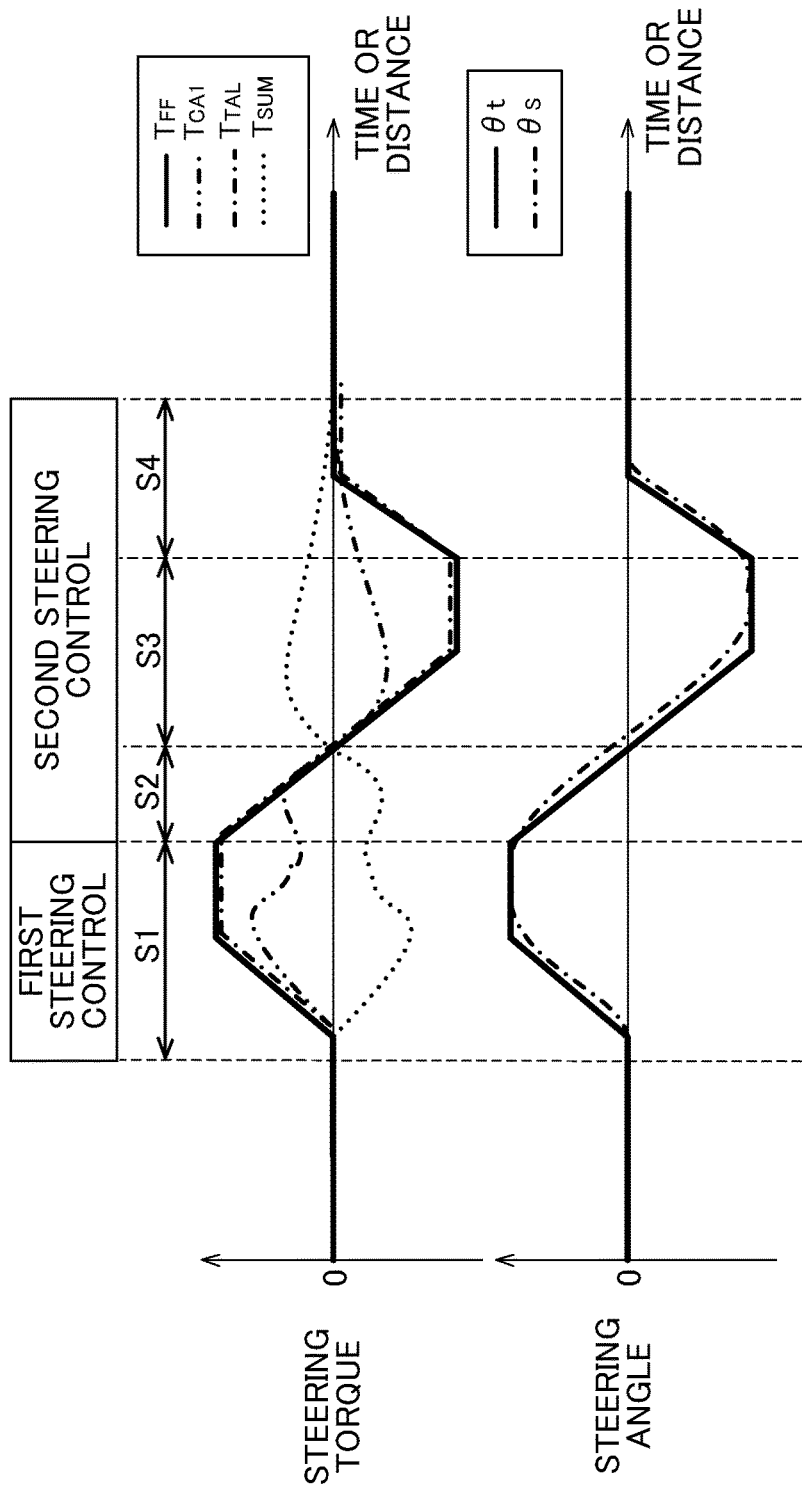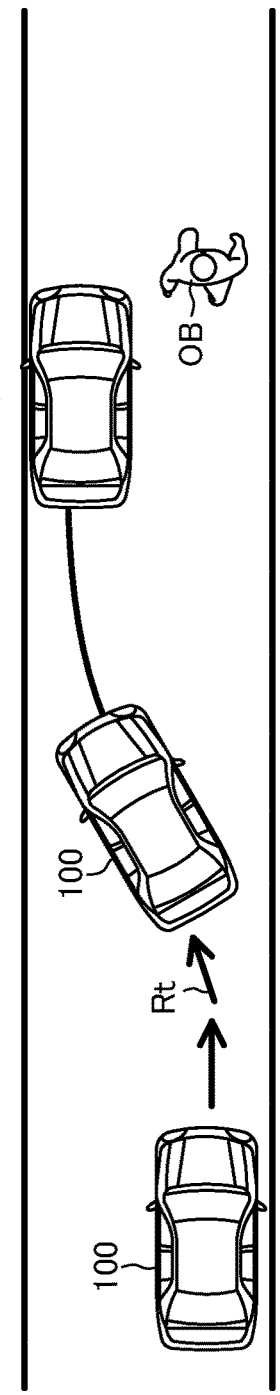
FIG.4A
FIG.4B
FIG.4C

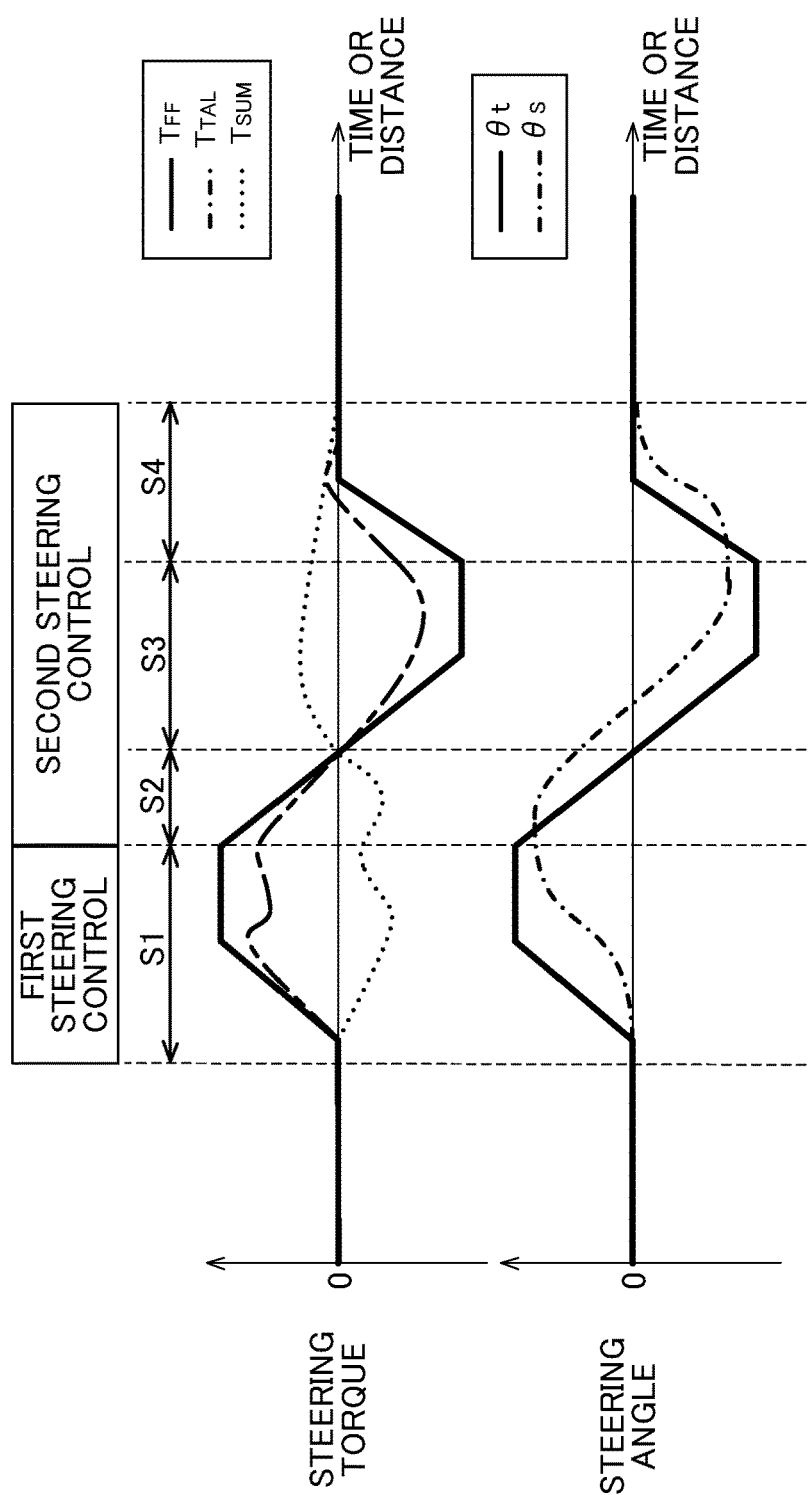
FIG.5A
FIG.5B
FIG.5C

DRIVING ASSISTANCE DEVICE, DRIVING ASSISTANCE METHOD, AND PROGRAM

BACKGROUND OF THE INVENTION

1. Field of the Invention

The present disclosure relates to a driving assistance device, a driving assistance method, and a program, and relates to a technology of collision avoidance control of avoiding collision between an own vehicle and an obstacle.

2. Description of the Related Art

For example, in Japanese Patent Application Laid-open No. 2004-256076, there is disclosed a technology of setting a gain of an assist torque for assisting in steering of a driver to a smaller gain during automatic steering than that used during manual steering, and gradually increasing the gain of the assist torque and gradually reducing a gain of an automatic steering torque when steering intervention by the driver is detected, to thereby switch the automatic steering to the manual steering.

There has been known, as a driving assistance device installed in a vehicle, a device which executes, when an obstacle which is highly likely to collide with an own vehicle is detected in front of the own vehicle, collision avoidance control of automatically controlling a steering angle of the own vehicle such that the collision with the obstacle is avoided. The collision avoidance control successively executes steering control for avoiding the collision of the own vehicle with the obstacle, and then executes steering control for preventing deviation of the own vehicle from a traveling lane. In the above-mentioned collision avoidance control, in order to achieve the avoidance of the collision with the obstacle and the prevention of the deviation from the traveling lane, it is important to increase steering angle followability of the automatic steering.

However, when the driver aimlessly holds a steering wheel during the execution of the collision avoidance control, a steering holding torque through the holding operation by the driver and an assist torque corresponding to this steering holding torque act toward an opposite direction on a control torque through the automatic steering. When this torque toward the opposite direction acts on the control torque, there is a problem in that steering angle followability of the automatic steering decreases, resulting in an insufficient steering angle and the like.

SUMMARY OF THE INVENTION

The present disclosure has been made in order to solve the above-mentioned problem. That is, one object of the present disclosure is to effectively increase steering angle followability of automatic steering through collision avoidance control.

According to at least one embodiment of the present disclosure, there is provided a driving assistance device (1) for executing collision avoidance control of controlling, when an obstacle (OB) which is highly likely to collide with an own vehicle (100) is detected in a region located on a front side and front lateral sides of the own vehicle (100), a steering angle (θs) of the own vehicle (100) so that the own vehicle (100) travels along a target trajectory (Rt) which enables the own vehicle (100) to avoid the collision with the obstacle (OB) without deviating from a traveling lane (LA1), the driving assistance device including: a target steering torque setting unit (10) configured to set a target steering angle (θt) required to cause the own vehicle (100) to travel along the target trajectory (Rt), and to set a target steering torque (Tt) for matching a steering angle (θs) of the own vehicle (100) with the target steering angle (θt) under a state in which a driver steering torque (Tdr) generated through one of a holding operation or a steering operation of a steering wheel (SW) by a driver of the own vehicle (100) is not generated; a cancellation torque setting unit (17) configured to set a cancellation torque ($T_{CA}$) being a torque in a direction of canceling a total steering torque ($T_{SUM}$) obtained by summing the driver steering torque (Tdr) and a steering assist torque ($T_{AS}$) set based on the driver steering torque (Tdr); and a steering control unit (10, 60) configured to execute steering control of controlling the steering angle (θs) of the own vehicle (100) based on a torque control amount obtained by adding the target steering torque (Tt) to the cancellation torque ($T_{CA}$).

According to at least one embodiment of the present disclosure, there is provided a driving assistance method of executing collision avoidance control of controlling, when an obstacle (OB) which is highly likely to collide with an own vehicle (100) is detected in a region located on a front side and front lateral sides of the own vehicle (100), a steering angle (θs) of the own vehicle (100) so that the own vehicle (100) travels along a target trajectory (Rt) which enables the own vehicle (100) to avoid the collision with the obstacle (OB) without deviating from a traveling lane (LA1), the driving assistance method including: setting a target steering angle (θt) required to cause the own vehicle (100) to travel along the target trajectory (Rt), and setting a target steering torque (Tt) for matching a steering angle (θs) of the own vehicle (100) with the target steering angle (θt) under a state in which a driver steering torque (Tdr) generated through one of a holding operation or a steering operation of a steering wheel (SW) by a driver of the own vehicle (100) is not generated; setting a cancellation torque ($T_{CA}$) being a torque in a direction of canceling a total steering torque ($T_{SUM}$) obtained by summing the driver steering torque (Tdr) and a steering assist torque ($T_{AS}$) set based on the driver steering torque (Tdr); and executing steering control of controlling the steering angle (θs) of the own vehicle (100) based on a torque control amount obtained by adding the target steering torque (Tt) to the cancellation torque ($T_{CA}$).

According to at least one embodiment of the present disclosure, there is provided a program for causing a computer of a driving assistance device (1) for executing collision avoidance control of controlling, when an obstacle (OB) which is highly likely to collide with an own vehicle (100) is detected in a region located on a front side and front lateral sides of the own vehicle (100), a steering angle (θs) of the own vehicle (100) so that the own vehicle (100) travels along a target trajectory (Rt) which enables the own vehicle (100) to avoid the collision with the obstacle (OB) without deviating from a traveling lane (LA1), to execute the processes of: setting a target steering angle (θt) required to cause the own vehicle (100) to travel along the target trajectory (Rt), and setting a target steering torque (Tt) for matching a steering angle (θs) of the own vehicle (100) with the target steering angle (θt) under a state in which a driver steering torque (Tdr) generated through one of a holding operation or a steering operation of a steering wheel (SW) by a driver of the own vehicle (100) is not generated; setting a cancellation torque ($T_{CA}$) being a torque in a direction of canceling a total steering torque ($T_{SUM}$) obtained by summing the driver steering torque (Tdr) and a steering assist torque ($T_{AS}$) set based on the driver steering torque (Tdr); and executing steering control of controlling the steering angle (θs) of the own vehicle (100) based on a torque control amount obtained by adding the target steering torque (Tt) to the cancellation torque ($T_{CA}$).

With the above-mentioned configuration, during the execution of the automatic steering, the driving assistance ECU 10 applies the cancellation torque ($T_{CA}$) for canceling the driver total torque ($T_{SUM}$) obtained by summing the driver steering torque (Tdr) generated through the holding operation or the steering operation of the driver and the assist torque ($T_{AS}$) generated in accordance with the driver steering torque (Tdr). As a result, an insufficient steering angle of the actual steering angle (θs) with respect to the target steering angle (θt) which is caused by the driver total torque ($T_{SUM}$) during the execution of the automatic steering is suppressed, and hence steering angle followability can be increased.

In another aspect of the present disclosure, the cancellation torque setting unit (17) includes: a basic cancellation torque setting unit (17A) configured to set a basic cancellation torque ($T_{CA1}$) for completely canceling the total steering torque ($T_{SUM}$); and a gain setting unit (17B) configured to set a cancellation gain (K) corresponding to a magnitude of the driver steering torque (Tdr), and the cancellation torque setting unit (17) is configured to set the cancellation torque ($T_{CA}$) by multiplying the basic cancellation torque ($T_{CA1}$) by the cancellation gain (K).

According to this aspect, the optimal cancellation torque ($T_{CA}$) corresponding to a magnitude of the driver steering torque (Tdr) can be applied.

In another aspect of the present disclosure, the gain setting unit (17B) is configured to set the cancellation gain (K) such that the cancellation gain (K) decreases as the driver steering torque (Tdr) increases.

According to this aspect, it is possible to effectively prevent the steering operation of the driver from being interfered with when the driver has steering intention to execute the steering operation.

In another aspect of the present disclosure, the gain setting unit (17B) is configured to set the cancellation gain (K) to 0 when a state in which the driver steering torque (Tdr) is equal to or higher than a predetermined threshold torque continues for a predetermined threshold time or longer.

According to this aspect, it is possible to reliably prevent the steering operation of the driver from being interfered with when the driver clearly has steering intention to execute the steering operation.

In another aspect of the present disclosure, the gain setting unit (17B) is configured to set the cancellation gain (K) such that the cancellation gain (K) decreases as a separation amount (ΔT) between the target steering torque and the driver steering torque (Tdr) increases, and to set the cancellation gain (K) to 0 when the separation amount (ΔT) exceeds a predetermined threshold value.

According to this aspect, the optimal cancellation torque ($T_{CA}$) corresponding to strength (degree) of the steering intention of the driver can be applied.

The gain setting unit (17B) is configured to set the cancellation gain (K) to 0 also when a state in which the separation amount (ΔT) is equal to or smaller than the predetermined threshold value continues for a predetermined threshold time or longer.

According to this aspect, it is possible to effectively prevent the steering operation of the driver from being interfered with after the steering intention of the driver becomes clear.

The gain setting unit (17B) is configured to set the cancellation gain (K) to 1 when the driver steering torque (Tdr) changes to increase and decrease within a predetermined torque range.

According to this aspect, in a case in which the driver aimlessly holds the steering wheel (SW), the cancellation gain (K) is set to 1, that is, the basic cancellation torque ($T_{CA1}$) for completely canceling the total steering torque ($T_{SUM}$) is applied, and thus the steering angle followability of the automatic steering can reliably be increased.

In order to facilitate the understanding of the invention, in the above description, the constituent features of the invention corresponding to at least one embodiment of the present disclosure are suffixed in parentheses with reference symbols used in the at least one embodiment. However, the constituent features of the invention are not intended to be limited to those in the at least one embodiment as defined by the reference symbols.

BRIEF DESCRIPTION OF THE DRAWINGS

FIG. 4A, FIG. 4B, and FIG. 4C are schematic diagrams for illustrating the at least one embodiment in which a cancellation torque is applied during execution of the collision avoidance control.

FIG. 5A, FIG. 5B, and FIG. 5C are schematic diagrams for illustrating a comparative example in which the cancellation torque is not applied during the execution of the collision avoidance control.

DESCRIPTION OF THE EMBODIMENTS

Description is now given of a driving assistance device, a driving assistance method, and a program according to at least one embodiment of the present disclosure with reference to the drawings. Like components are denoted by like reference symbols and the same applies to the names and functions of those components. Thus, a detailed description of those components is not repeated.

[Overall Configuration]

Figure 1:
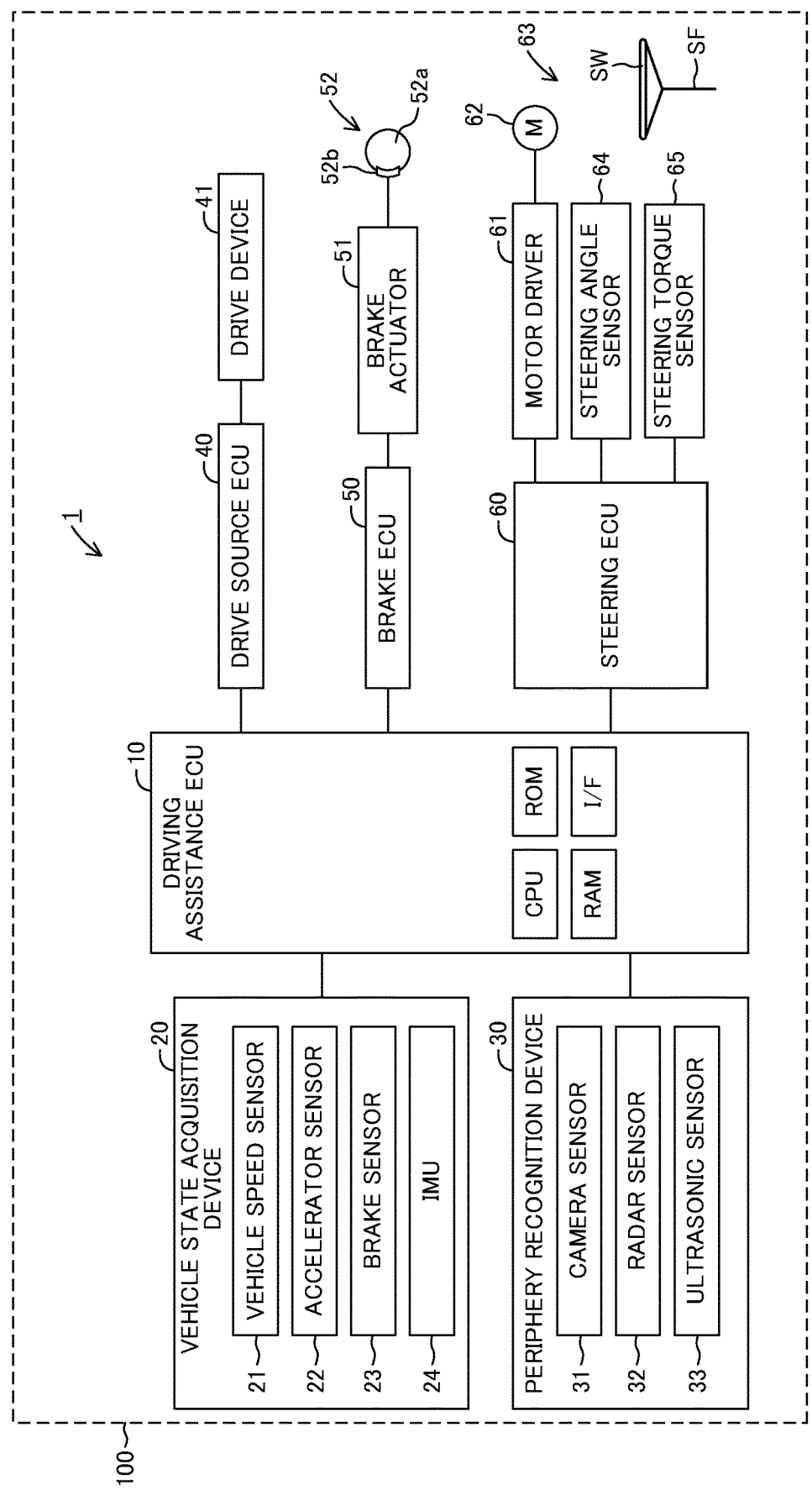
FIG. 1 is a schematic overall configuration diagram of a driving assistance device according to at least one embodiment of the present disclosure.

FIG. 1 is a schematic overall configuration diagram of a driving assistance device 1 according to the at least one embodiment. As illustrated in FIG. 1, the driving assistance device 1 is mounted to a vehicle 100. The vehicle 100 to which the driving assistance device 1 is mounted is hereinafter also referred to as "own vehicle" to distinguish this vehicle 100 from other vehicles. The driving assistance device 1 includes a driving assistance ECU 10, a drive source ECU 40, a brake ECU 50, and a steering ECU 60. Each of the ECUs 10, 40, 50, and 60 includes a microcomputer as a principal component, and is connected for mutual transmission and reception via a controller area network (CAN) (not shown). The term "ECU" is an abbreviation for "electronic control unit." The microcomputer includes a CPU, a ROM, a RAM, and an interface, for example, and the CPU implements various functions by executing instructions (programs, or routines) stored in the ROM. Some or all of the ECUs 10, 40, 50, and 60 may be integrated into one ECU to serve as a controller.

The driving assistance ECU 10 is a control device serving as a center of the execution of the driving assistance for a driver, and executes collision avoidance control in the at least one embodiment. The driving assistance ECU 10 is connected to a vehicle state acquisition device 20 and a periphery recognition device 30, and is configured to receive output signals and detection signals from those devices 20 and 30 each time a predetermined cycle elapses.

The vehicle state acquisition device 20 is sensors which acquire states of the vehicle 100. Specifically, the vehicle state acquisition device 20 includes a vehicle speed sensor 21, an accelerator sensor 22, a brake sensor 23, an inertial measurement unit (IMU) 24, and the like.

The vehicle speed sensor 21 detects a travel speed of the vehicle 100 (vehicle speed V). The vehicle speed sensor 21 may be a wheel speed sensor. The accelerator sensor 22 detects an operation amount of an accelerator pedal (not shown) by a driver. The brake sensor 23 detects an operation amount of a brake pedal (not shown) by the driver. The IMU 24 detects an acceleration in each of a front-rear direction, a right-left direction, and an up-down direction of the vehicle 100 and an angular velocity in each of a roll direction, a pitch direction, and a yaw direction (yaw rate Yr) of the vehicle 100.

The periphery recognition device 30 is sensors which acquire target information on targets around the vehicle 100. Specifically, the periphery recognition device 30 includes a camera sensor 31, a radar sensor 32, an ultrasonic sensor 33, and the like.

The camera sensor 31 is, for example, a stereo camera or a monocular camera, and a digital camera including an image pickup element such as a CMOS or a CCD can be used as the sensor 31. The camera sensor 31 captures an image of a region located on a front side and front lateral sides of the vehicle 100, and processes captured image data, to thereby recognize road surface markings. The road surface markings include separation lines. The separation lines are lines marked on a road in order to partition travel of vehicles for each direction. The separation line includes a solid-line separation line and a broken-line separation line. In the at least one embodiment, a region between two separation lines next to each other and extending on a vehicle road is defined as a lane. The camera sensor 31 calculates a shape of the lane based on the recognized separation lines. Moreover, the camera sensor calculates presence or absence of a three-dimensional object in the region located on the front side and the front lateral sides of the own vehicle 100, a type of the three-dimensional object, and a relative relationship between the own vehicle 100 and the three-dimensional object based on the captured image data. The type of the three-dimensional object can be determined by analyzing the image data through use of a well-known pattern matching method.

The radar sensor 32 detects a target existing in a region located on the front side and the front lateral sides of the vehicle 100. The radar sensor 32 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires the relative distance between the vehicle 100 and the target, the relative speed between the vehicle 100 and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle 100, the relative distance between the vehicle 100 and the target, the relative speed between the vehicle 100 and the target, and the like.

The ultrasonic sensor 33 transmits an ultrasonic wave in a pulse form within a predetermined range in a periphery of the vehicle 100, and receives a reflected wave reflected by a three-dimensional object. The ultrasonic sensor 33 acquires target information indicating a reflected point being a point on the three-dimensional object on which the transmitted ultrasonic wave is reflected, a distance from the ultrasonic sensor 33, and the like based on a time from the transmission to the reception of the ultrasonic wave.

The drive source ECU 40 is connected to a drive device 41. The drive device 41 generates a driving force to be transmitted to driving wheels of the vehicle 100. As the drive device 41, for example, an electric motor and an engine are given. The vehicle 100 may be any one of an engine vehicle, a hybrid vehicle (HEV), a plug-in hybrid electric vehicle (PHEV), a fuel cell electric vehicle (FCEV), and a battery electric vehicle (BEV). The drive source ECU 40 sets a driver-requested driving torque based on an accelerator pedal operation amount acquired by the accelerator sensor 22 and the like, and controls the operation of the drive device 41 such that the drive device 41 outputs the driver-requested driving torque.

The brake ECU 50 is connected to a brake actuator 51. The brake actuator 51 is provided in a hydraulic circuit between a master cylinder (not shown) which pressurizes a hydraulic fluid through use of a stepping force on the brake pedal and a brake mechanism 52 provided to each wheel. The brake mechanism 52 includes a brake disc 52a fixed to the wheel and a brake caliper 52b fixed to a vehicle body. The brake mechanism 52 is not limited to the disc-type brake, and may be another brake mechanism such as a drum-type brake which applies a braking force to the wheel of the vehicle 100.

The brake actuator 51 adjusts a hydraulic pressure of the fluid supplied to a wheel cylinder integrated into the brake caliper 52b in response to an instruction from the brake ECU 50, and operates the wheel cylinder through this hydraulic pressure. As a result, the brake actuator 51 presses brake pads against the brake disc 52a, to thereby generate a frictional braking force. Thus, the brake ECU 50 can control a braking force of the vehicle 100 by controlling the brake actuator 51.

The steering ECU 60 is connected to a motor driver 61. The motor driver 61 is connected to a steering motor 62. The steering motor 62 is built into a steering device 63 including a steering wheel SW, a steering shaft SF, and the like. The steering device 63 may be any one of a rack-and-pinion type and a steer-by-wire type. The steering motor 62 generates a steering torque through use of electric power supplied from the motor driver 61. Right and left steered wheels of the vehicle 100 can be steered though use of this steering torque. That is, the steering motor 62 can change a steering angle of the vehicle 100 (steering angle of the steered wheels).

The steering ECU 60 is connected to a steering angle sensor 64 and a steering torque sensor 65. The steering angle sensor 64 detects a rotation angle of the steering wheel SW or the steering shaft SF, that is, an actual steering angle θs. The steering torque sensor 65 detects a rotational torque of the steering wheel SW or the steering shaft SF, that is, a driver steering torque Tdr. The driver steering torque Tdr as used herein is a concept including both of a steering torque generated when the driver rotates the steering wheel SW and a steering holding torque generated when the driver holds the steering wheel SW. The actual steering angle θs and the driver steering torque Tdr, for example, take positive values when the steering wheel SW is rotated toward the left direction from a predetermined reference position (neutral position), and take negative values when the steering wheel SW is rotated toward the right direction from the predetermined reference position. The neutral position is a reference position at which the actual steering angle θs is substantially zero, and is a position of the steering wheel SW at the time when the vehicle 100 travels substantially straight.

The steering ECU 60 controls the drive of the steering motor 62 based on the actual steering angle θs detected by the steering angle sensor 64, the actual steering torque Tq detected by the steering torque sensor 65, and the vehicle speed V detected by the vehicle speed sensor 21. The steering ECU 60 can apply an assist torque for assisting in a steering operation of the driver to the steering device 63 through use of the drive of this steering motor 62.

Moreover, when the steering ECU 60 receives a steering command from the driving assistance ECU 10 during the execution of the collision avoidance control, the steering ECU 60 drives the steering motor 62 via the motor driver 61 based on a target steering torque specified by this steering command. As a result, the steering ECU 60 generates the steering torque such that the steering torque matches the target steering torque. This steering torque is different from the above-mentioned assist torque, and is a torque applied to the steering device 63 based on the steering command from the driving assistance ECU 10. Thus, the driving assistance ECU 10 can automatically change the steering angle of the steered wheels of the vehicle 100 via the steering ECU 60 without requiring the steering operation of the driver during the execution of the collision avoidance control.

[Collision Avoidance Control]

Figure 2:
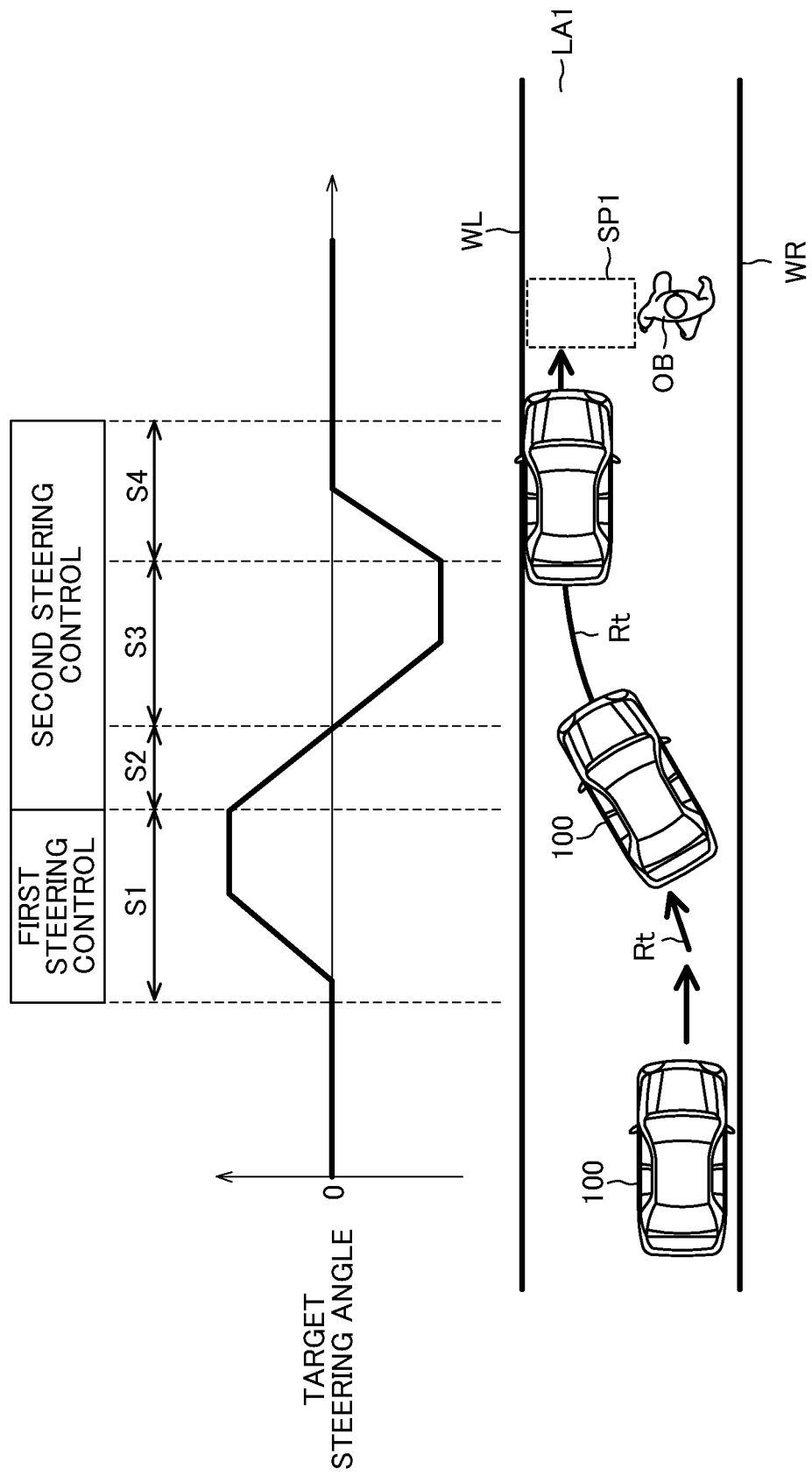
FIG. 2 is a schematic diagram for illustrating an overview of an operation of collision avoidance control in the at least one embodiment.
Figure 3:
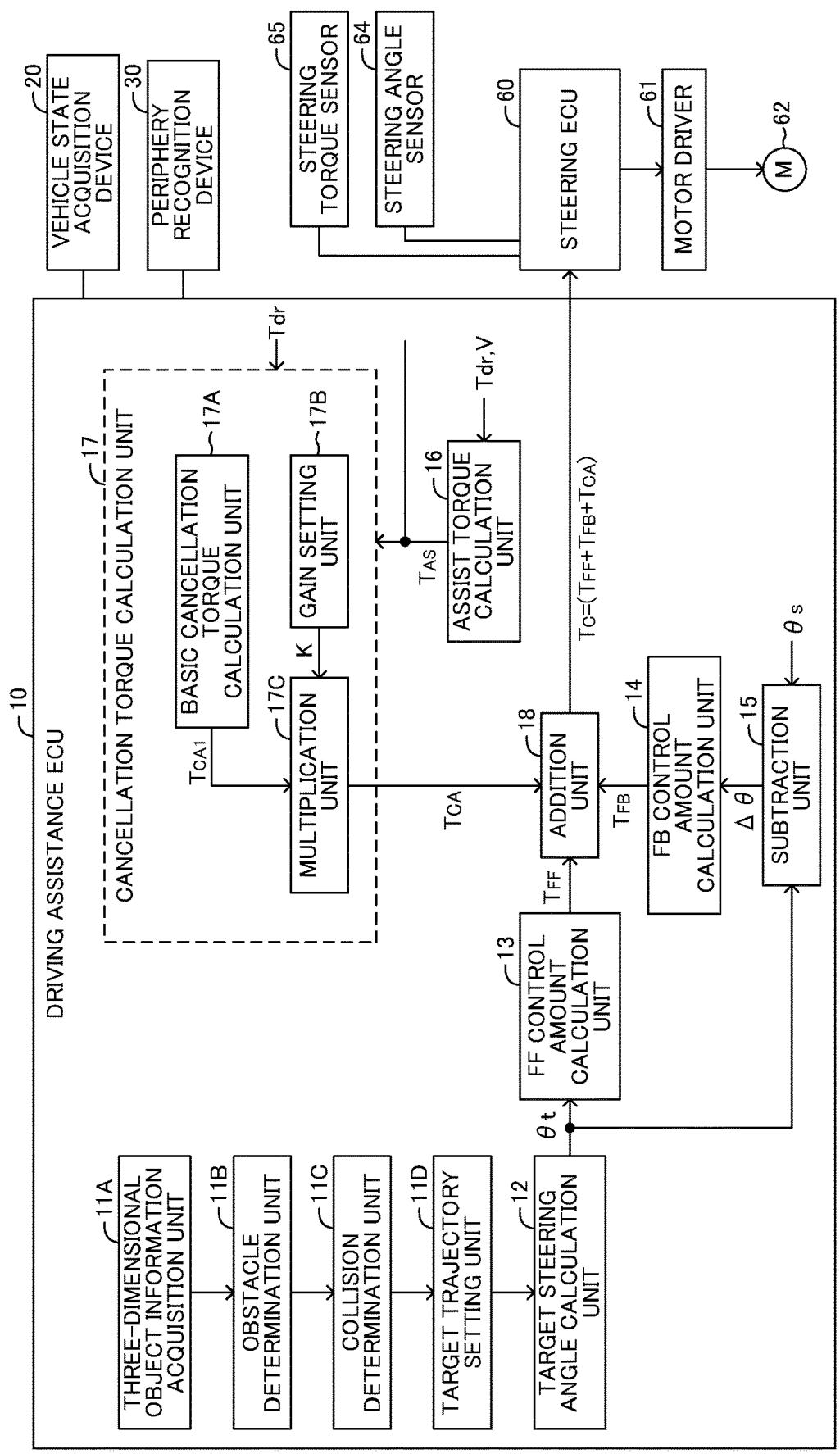
FIG. 3 is a control block diagram of a driving assistance ECU in the at least one embodiment.

Next, referring to FIG. 2 and FIG. 3, an overview of an operation of the collision avoidance control is described. As illustrated in FIG. 2, it is assumed that, when the own vehicle 100 is traveling on a traveling lane LA1, which is, for example, a straight road, there occurs a situation in which an obstacle OB, which is a three-dimensional object (target) and is highly likely to collide with the own vehicle 100, exists. In this case, the driving assistance ECU 10 executes the collision avoidance control of avoiding the collision of the own vehicle 100 with the obstacle OB. The collision avoidance control refers to control of automatically steering the steered wheels of the own vehicle 100 such that the own vehicle 100 avoids the collision with the obstacle OB without deviating from the traveling lane LA1. The automatic steering as used herein is a concept including steering assistance of assisting in the steering operation of the driver such that the own vehicle 100 avoids the collision with the obstacle OB.

Specifically, the driving assistance ECU 10 executes, as the collision avoidance control, "first steering control" for avoiding the collision with the obstacle OB, and then executes "second steering control" for maintaining the own vehicle 100 within the traveling lane LA1. In the first steering control, "first incremental steering" (see a section S1) of incrementing the steering angle from, for example, a neutral position (state in which the steering angle is substantially 0). In the second steering control, there are successively executed "first decremental steering (see a section S2)" of returning the steering angle incremented through the first steering control to the neutral position, "second incremental steering" (see a section S3) of incrementing the steering angle from the neutral position toward an opposite direction of the steering direction of the first steering control, and "second decremental steering" (see a section S4) of again returning the steering to the neutral position.

FIG. 3 is a control block diagram of the driving assistance ECU 10 which executes the collision avoidance control. The driving assistance ECU 10 includes, as a part of function elements, a three-dimensional object information acquisition unit 11A, an obstacle determination unit 11B, a collision determination unit 11C, a target trajectory setting unit 11D, a target steering angle calculation unit 12, an FF control amount calculation unit 13, an FB control amount calculation unit 14, a subtraction unit 15, an assist torque calculation unit 16, a cancellation torque calculation unit 17, and an addition unit 18. Those functional elements are included in the driving assistance ECU 10 which is integrated hardware in this description, but any part thereof may be provided to another ECU independent of the driving assistance ECU 10. Moreover, all or a part of the functional elements of the driving assistance ECU 10 may be provided in an information processing device installed at a facility (for example, a control center) which can communicate to and from the own vehicle 100.

The three-dimensional object information acquisition unit 11A recognizes, based on position information on a left white line WL and a right white line WR (see FIG. 2) transmitted from the periphery recognition device 30, the traveling lane LA1 partitioned by the left white line WL and the right white line WR. Moreover, the three-dimensional object information acquisition unit 11A determines whether or not three-dimensional objects exist in the region located on the front side and the front lateral sides of the own vehicle 100 based on the target information transmitted from the periphery recognition device 30. When the three-dimensional object information acquisition unit 11A determines that three-dimensional objects exist, the three-dimensional object information acquisition unit 11A generates information on all of the three-dimensional objects determined to exist. Specifically, the three-dimensional object information acquisition unit 11A uses a coordinate system which has a center position at a front end of the own vehicle 100 as an origin, and extends from this origin toward the right direction and the left direction and the front side to generate coordinate information on the three-dimensional objects including position coordinates of each three-dimensional object.

The obstacle determination unit 11B determines whether or not each of all of the three-dimensional objects acquired by the three-dimensional object information acquisition unit 11A is an obstacle OB which is likely to collide with the own vehicle 100. Specifically, the obstacle determination unit 11B calculates a trajectory of the own vehicle 100 based on the vehicle speed V detected by the vehicle speed sensor 21, the yaw rate Yr detected by the IMU 24, and the actual steering angle θs detected by the steering angle sensor 64.

Moreover, the obstacle determination unit 11B calculates a trajectory of each three-dimensional object based on the coordinate information on each three-dimensional object. The obstacle determination unit 11B determines whether or not the own vehicle 100 is likely to collide with any one of the three-dimensional objects when the own vehicle 100 travels while maintaining a current travel state and each three-dimensional object moves while maintaining a current movement state based on the trajectory of the own vehicle 100 and the trajectory of each three-dimensional object. When the three-dimensional object is stationary, the driving assistance ECU 10 executes this determination processing based on the trajectory of the own vehicle 100 and the current position of the three-dimensional object. When the obstacle determination unit 11B determines that the own vehicle 100 is likely to collide with the three-dimensional object based on a result of the determination, the obstacle determination unit 11B determines that this three-dimensional object is an obstacle OB.

The collision determination unit 11C calculates, when the obstacle determination unit 11B determines that the three-dimensional object is an obstacle OB, an estimated time to the collision of the own vehicle 100 with the obstacle OB (time to collision, hereinafter referred to as "TTC") based on a distance L from the vehicle 100 to the obstacle OB and a relative speed Vr of the own vehicle 100 with respect to the obstacle OB. The TTC is an index value which indicates a possibility of the collision of the own vehicle 100 with the obstacle OB. The TTC can be obtained by dividing the distance L from the own vehicle 100 to the obstacle OB by the relative speed Vr (TTC=L/Vr). The collision determination unit 11C determines that the own vehicle 100 is highly likely to collide with the obstacle OB when the TTC is equal to or shorter than a predetermined collision determination threshold value TTCth.

The target trajectory setting unit 11D calculates, when the collision determination unit 11C determines that the own vehicle 100 is highly likely to collide with the obstacle OB, a trajectory which enables the vehicle 100 to avoid the collision with the obstacle OB without interfering therewith through use of a well-known method, and sets the calculated trajectory as a target trajectory Rt (see FIG. 2) (see, for example, Japanese Patent Application Laid-open No. 2017-43262 and Japanese Patent Application Laid-open No. 2018-106230). In this case, the target trajectory Rt is generated, based on the target information on the obstacle OB and the position of each of the left and right white lines WL and WR, such that the target trajectory Rt passes through a collision avoidance space SP1 set on any one of the left side and the right side of the obstacle OB and is within a range in which the own vehicle 100 does not deviate from the traveling lane LA1.

Specifically, as illustrated in FIG. 2, the target trajectory Rt is set so that the target trajectory Rt is formed of a first steering section S1 in which the first steering control for avoiding the collision between the vehicle 100 and the obstacle OB is executed and a second steering section S2 to a fourth steering section S4 in which the second steering control for maintaining the own vehicle 100 within the traveling lane LA1 is executed. In the first steering section S1, the first incremental steering of the first steering control is executed. In the second steering section S2, the first decremental steering of the second steering control is executed. In the third steering section S3, the second incremental steering of the second steering control is executed. In the fourth steering section S4, the second decremental steering of the second steering control is executed.

The target steering angle calculation unit 12 calculates, when the target trajectory Rt is set by the target trajectory setting unit 11D, the target steering angle θt which achieves the target yaw rate based on the current vehicle speed V of the own vehicle 100 and a target yaw rate required to cause the own vehicle 100 to travel along the target trajectory Rt. The target steering angle calculation unit 12 transmits the calculated target steering angle θt to the FF control amount calculation unit 13 and the subtraction unit 15.

The FF control amount calculation unit 13 calculates, based on the target steering angle θt, an FF target steering torque $T_{FF}$ which is a feedforward control amount. The FF target steering torque $T_{FF}$ is a torque control amount required to cause the own vehicle 100 to travel along the target trajectory Rt under a state in which the driver steering torque Tdr caused by the holding operation or the steering operation of the driver is not generated. For example, the FF control amount calculation unit 13 refers to an FF torque map (not shown) stored in advance based on the target steering angle θt, to thereby calculate the FF target steering torque $T_{FF}$. The FF torque map is set such that as the target steering angle θt increases, the FF target steering torque $T_{FF}$ increases. The calculation of the FF target steering torque $T_{FF}$ is not limited to the method which uses the map, and may be performed based on a calculation equation. The FF control amount calculation unit 13 transmits the calculated FF target steering torque $T_{FF}$ to the addition unit 18.

The subtraction unit 15 calculates, based on the target steering angle θt transmitted from the target steering angle calculation unit 12 and the actual steering angle θs detected by the steering angle sensor 64, a deviation Δθ between the target steering angle θt and the actual steering angle θs. The subtraction unit 15 transmits the calculated deviation Δθ to the FB control amount calculation unit 14.

The FB control amount calculation unit 14 calculates, based on the deviation Δθ, an FB target steering torque $T_{FB}$ which is a feedback control amount. The FB control amount calculation unit 14 uses, for example, a PID control equation, a PI control equation, and a P control equation, each of which includes the deviation Δθ as a proportional term, to calculate the FB target steering torque $T_{FB}$. The FB control amount calculation unit 14 transmits the calculated FB target steering torque $T_{FB}$ to the subtraction unit 15.

The assist torque calculation unit 16 calculates an assist torque $T_{AS}$ being an assist control amount for assisting in the steering operation of the driver. The assist torque calculation unit 16 refers to, for example, an assist torque map (not shown) stored in advance based on the driver steering torque Tdr and the vehicle speed V, to thereby calculate the assist torque $T_{AS}$. It is only required to acquire the driver steering torque Tdr based on the detection result of the steering torque sensor 65 and acquire the vehicle speed V based on the detection result of the vehicle speed sensor 21. It is preferred that the assist torque map be set such that the assist torque $T_{AS}$ (absolute value) increases as the driver steering torque Tdr (absolute value) increases, and that the assist torque $T_{AS}$ (absolute value) increases as the vehicle speed V decreases. The calculation of the assist torque $T_{AS}$ is not limited to the method which uses the map, and may be calculated based on a calculation equation. The assist torque calculation unit 16 transmits the calculated assist torque $T_{AS}$ to the cancellation torque calculation unit 17 and the steering ECU 60. When the steering ECU 60 receives the assist torque $T_{AS}$ from the assist torque calculation unit 16, the steering torque ECU 60 controls a current supplied to the steering motor 62 such that the torque generated by the steering motor 62 matches the assist torque $T_{AS}$.

The cancellation torque calculation unit 17 calculates a cancellation torque MA to be applied to cancel the driver steering torque Tdr and the assist torque $T_{AS}$ during the execution of the collision avoidance control. Specifically, the cancellation torque calculation unit 17 includes a basic cancellation torque calculation unit 17A, a gain setting unit 17B, and a multiplication unit 17C.

The basic cancellation torque calculation unit 17A calculates a basic cancellation torque $T_{CA1}$ ($=-T_{SUM}$) being a steering torque for completely canceling a driver total torque $T_{SUM}$ ($=Tdr+T_{AS}$) obtained by summing the driver steering torque Tdr and the assist torque $T_{AS}$. The driver steering torque Tdr as used herein is a concept including both of the steering torque generated when the driver executes the steering operation on the steering wheel SW and the steering holding torque generated when the driver holds the steering wheel SW. It is only required to acquire the driver steering torque Tdr based on the detection result of the steering torque sensor 65.

The basic cancellation torque calculation unit 17A inverts the signs of the total value of the driver steering torque Tdr and the assist torque $T_{AS}$, to thereby calculate the basic cancellation torque $T_{CA1}$. That is, when the driver total torque $T_{SUM}$ is a positive value (left turn direction), the basic cancellation torque $T_{CA1}$ is a negative value (right turn direction). When the driver total torque $T_{SUM}$ is a negative value (right turn direction), the basic cancellation torque $T_{CA1}$ is a positive value (left turn direction). The basic cancellation torque calculation unit 17A transmits the calculated basic cancellation torque $T_{CA1}$ to the multiplication unit 17C.

The gain setting unit 17B sets a control gain K corresponding to a cancellation rate for canceling the driver total torque $T_{SUM}$. The gain setting unit 17B sets the control gain K in a range of from "0" to "1." Details of the setting of the control gain K are described later. The gain setting unit 17B transmits the set control gain K to the multiplication unit 17C.

The multiplication unit 17C obtains a value ($=T_{CA1} \times K$) by multiplying the basic cancellation torque $T_{CA1}$ transmitted from the basic cancellation torque calculation unit 17A by the control gain K transmitted from the gain setting unit 17B, and transmits this value to the addition unit 18 as a final cancellation torque $T_{CA}$.

The addition unit 18 adds the FB target steering torque $T_{FB}$ transmitted from the FB control amount calculation unit 14 to the FF target steering torque $T_{FF}$ transmitted from the FF control amount calculation unit 13, to thereby calculate a target steering torque Tt ($=T_{FF}+T_{FB}$). Moreover, the addition unit 18 obtains an automatic steering torque control amount Tc ($=T_{FF}+T_{FB}+T_{CA}$) being a value obtained by adding the cancellation torque $T_{CA}(=T_{CA1} \times K)$ transmitted from the multiplication unit 17C to the target steering torque Tt, and transmits this automatic steering torque control amount Tc to the steering ECU 60 as a final control amount of the collision avoidance control. When the steering ECU 60 receives the automatic steering torque control amount Tc from the addition unit 18, the steering ECU 60 controls the current supplied to the steering motor 62 such that the torque generated by the steering motor 62 matches a value ($=T_{FF}+T_{FB}+T_{CA}+T_{AS}$) obtained by adding the automatic steering torque control amount Tc to the assist torque $T_{AS}$. As a result, the automatic steering of causing the own vehicle 100 to travel along the target trajectory Rt while canceling the driver total torque $T_{SUM}$ during the execution of the collision avoidance control is achieved.

Now, referring to FIG. 4A to FIG. 4C and FIG. 5A to FIG. 5C, a case in which the cancellation torque $T_{CA}$ is applied during the execution of the collision avoidance control and a case in which the cancellation torque $T_{CA}$ is not applied during the execution of the collision avoidance control are compared with each other. FIG. 4A to FIG. 4C are diagrams of an example in the at least one embodiment in which the cancellation torque $T_{CA}$ is applied. FIG. 5A to FIG. 5C are diagrams in a comparative example in which the cancellation torque $T_{CA}$ is not applied. In the examples of FIG. 4A to FIG. 4C and FIG. 5A to FIG. 5C, the own vehicle 100 avoids the collision with the obstacle OB through left turn steering. When the collision is avoided through right turn steering, only the signs of the steering angle and the steering torque are inverted. Thus, description of the right turn steering is omitted below.

First, the comparative example of FIG. 5A to FIG. 5C is described. When the driver aimlessly holds the steering wheel SW during the execution of the collision avoidance control, the driver total torque $T_{SUM}$ obtained by summing the driver steering holding torque generated through the holding operation of the driver and the assist torque corresponding to the driver steering holding torque is applied to the steered wheels of the vehicle 100 as indicated by a broken line of FIG. 5A. This driver total torque $T_{SUM}$ acts toward a direction opposite to that of the control torque through the automatic steering of the collision avoidance control. That is, the driver total torque $T_{SUM}$ is a negative value opposite to the FF target steering torque $T_{FF}$ in the first steering control (section S1) and the first decremental steering of the second steering control (section S2), and is a positive value opposite to the FF target steering torque $T_{FF}$ in the second incremental steering (section S3) and the second decremental steering (section S4) of the second steering control.

When such a driver total torque $T_{SUM}$ is added during the execution of the collision avoidance control, a combined torque $T_{TAL}$ (absolute value) obtained by combining the driver total torque $T_{SUM}$ and the FF target steering torque $T_{FF}$ with each other, which is indicated by a one-dot chain line of FIG. 5A, is lower than the FF target steering torque $T_{FF}$ (absolute value). That is, as indicated by a one-dot chain line of FIG. 5B, deterioration in steering angle followability in which the actual steering angle θs separates from the target steering angle θt is caused. As a result, there occurs a possibility that the collision between the own vehicle 100 and the obstacle OB cannot be avoided in the first steering control, and there occurs a possibility that the own vehicle 100 cannot reliably be maintained within the traveling lane LA1 in the second steering control.

FIG. 4A to FIG. 4C show the at least one embodiment in which the cancellation torque $T_{CA}$ is applied. In the example of FIG. 4A to FIG. 4C, it is assumed that the control gain K is set to "1," that is, the cancellation rate is set to 100%. In the at least one embodiment of FIG. 4A to FIG. 4C, the driving assistance ECU 10 applies the basic cancellation torque $T_{CA1}$ (see two-dot chain line of FIG. 4A to FIG. 4C) for completely canceling the driver total torque $T_{SUM}$ during the execution of the collision avoidance control. That is, the basic cancellation torque $T_{CA1}$ having a positive value in a direction opposite to the driver total torque $T_{SUM}$ is added to the FF target steering torque $T_{FF}$ in the first steering control (section S1) and the first decremental steering (section S2) of the second steering control. The basic cancellation torque $T_{CA1}$ having a negative value in a direction opposite to the driver total torque $T_{SUM}$ is added to the FF target steering torque $T_{FF}$ in the second incremental steering (section S3) and the second decremental steering (section S4) of the second steering control.

When such a basic cancellation torque $T_{CA1}$ is added to the FF target steering torque $T_{FF}$, the combined torque $T_{TAL}$ (absolute value) obtained by combining the driver total torque $T_{SUM}$, the FF target steering torque $T_{FF}$, and the basic cancellation torque $T_{CA1}$, which is indicated by a one-dot chain line of FIG. 4A, substantially matches the FF target steering torque $T_{FF}$ (absolute value). That is, as indicated by a broken line of FIG. 4B, such an increase in steering angle followability that the actual steering angle θs substantially matches the target steering angle θt is achieved. As a result, the collision between the own vehicle 100 and the obstacle OB can reliably be avoided in the first steering control, and the own vehicle 100 can reliably be maintained within the traveling lane LA1 in the second steering control.

In this case, when the control gain K is uniformly set to "1," that is, the cancellation rate is uniformly set to 100%, the steering operation of the driver is greatly interfered with when the driver has steering intention to operate the steering wheel SW. As a result, there is a fear in that a dangerous behavior of the vehicle 100 is caused. Thus, when steering intervention of the driver is detected, the gain setting unit 17B (illustrated in FIG. 3) in the at least one embodiment appropriately sets the control gain K to a small value.

Figure 6:
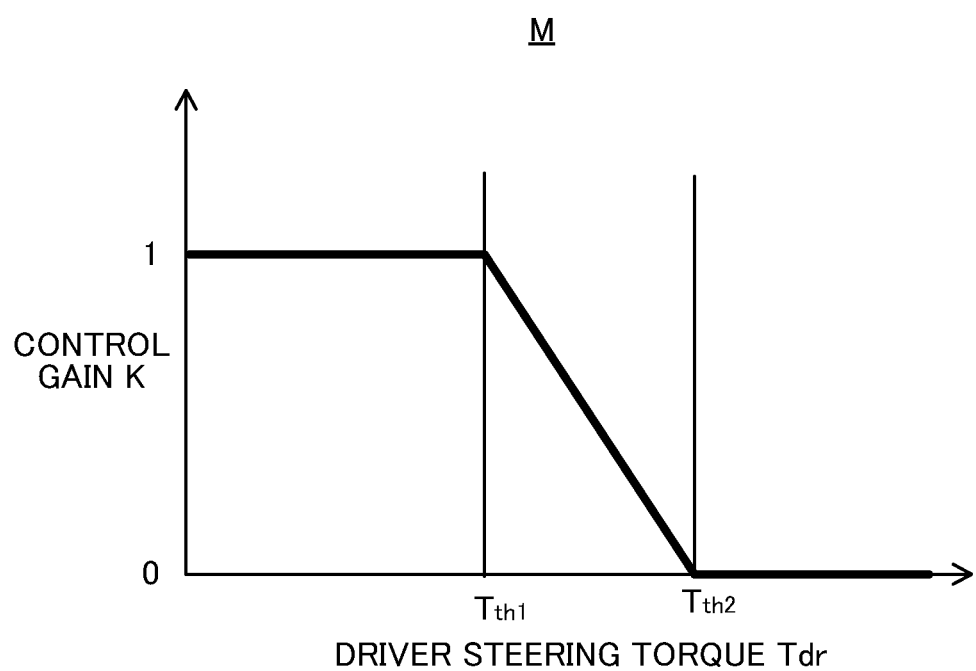
FIG. 6 is a schematic graph for showing an example of a gain setting map.

Specifically, a gain setting map M of FIG. 6 is stored in advance in a memory of the driving assistance ECU 10. In the gain setting map M, for example, the control gain K is defined on a vertical axis, and the driver steering torque Tdr is defined on a horizontal axis. The gain setting unit 17B refers to the gain setting map M based on the driver steering torque Tdr detected by the steering torque sensor 65, to thereby set the control gain K corresponding to the driver steering torque Tdr.

In the gain setting map M in the at least one embodiment, a first threshold torque Tth1 and a second threshold torque Tth2 for determining whether or not the steering intention of the driver exists are set. It is only required to set the first threshold torque Tth1 and the second threshold torque Tth2 by executing experiments, simulation, or the like in advance.

The first threshold torque Tth1 is set in advance with the maximum value of the steering torque at the time when the driver aimlessly holds the steering wheel SW as a reference. When the driver steering torque Tdr is equal to or lower than the first threshold torque Tth1 (Tdr≤Tth1), the control gain K is set to "1" (cancellation rate: 100%). That is, when the driver aimlessly holds the steering wheel SW during the execution of the collision avoidance control, the cancellation torque $T_{CA}$ (=basic cancellation torque $T_{CA1}$×1) which completely cancels the driver total torque $T_{SUM}$ obtained by summing the driver steering holding torque Tdr and the assist torque $T_{AS}$ is to be applied. As a result, the steering angle followability of the automatic steering can reliably be increased.

The second threshold torque Tth2 is set in advance with the minimum value of the steering torque at the time when the driver intentionally operates the steering wheel SW as a reference. The second threshold torque Tth2 is a value larger than the first threshold torque Tth1 (Tth2>Tth1). When the driver steering torque Tdr is equal to or higher than the second threshold torque Tth2 (Tdr≥Tth2), the control gain K is set to "0" (cancellation rate: 0%). That is, when the driver intentionally executes the steering operation during the execution of the collision avoidance control, the cancellation torque $T_{CA}$ for canceling the driver total torque $T_{SUM}$ is set to "0." As a result, when the driver has the steering intention, it is possible to effectively prevent the steering operation of the driver from being interfered with.

When the driver steering torque Tdr is between the first threshold torque Tth1 and the second threshold torque Tth2 (Tth1<Tdr<Tth2), the driver may intentionally execute the steering operation, or the driver may aimlessly hold the steering wheel SW. In this case, the control gain K is set such that the control gain K approaches "0" as the driver steering torque Tdr approaches from the first threshold torque Tth1 to the second threshold torque Tth2. That is, the control gain K is set such that the control gain K decreases as the driver steering torque Tdr increases. As described above, when the driver may have the steering intention, or the driver may aimlessly hold the steering wheel SW, the gain K is caused to transition from "1" to "0," that is, gradually reduced as the driver steering torque Tdr increases, thereby being capable of effectively preventing the steering operation of the driver from being greatly interfered with while the decrease in steering angle followability of the automatic steering is suppressed.

Figure 7:
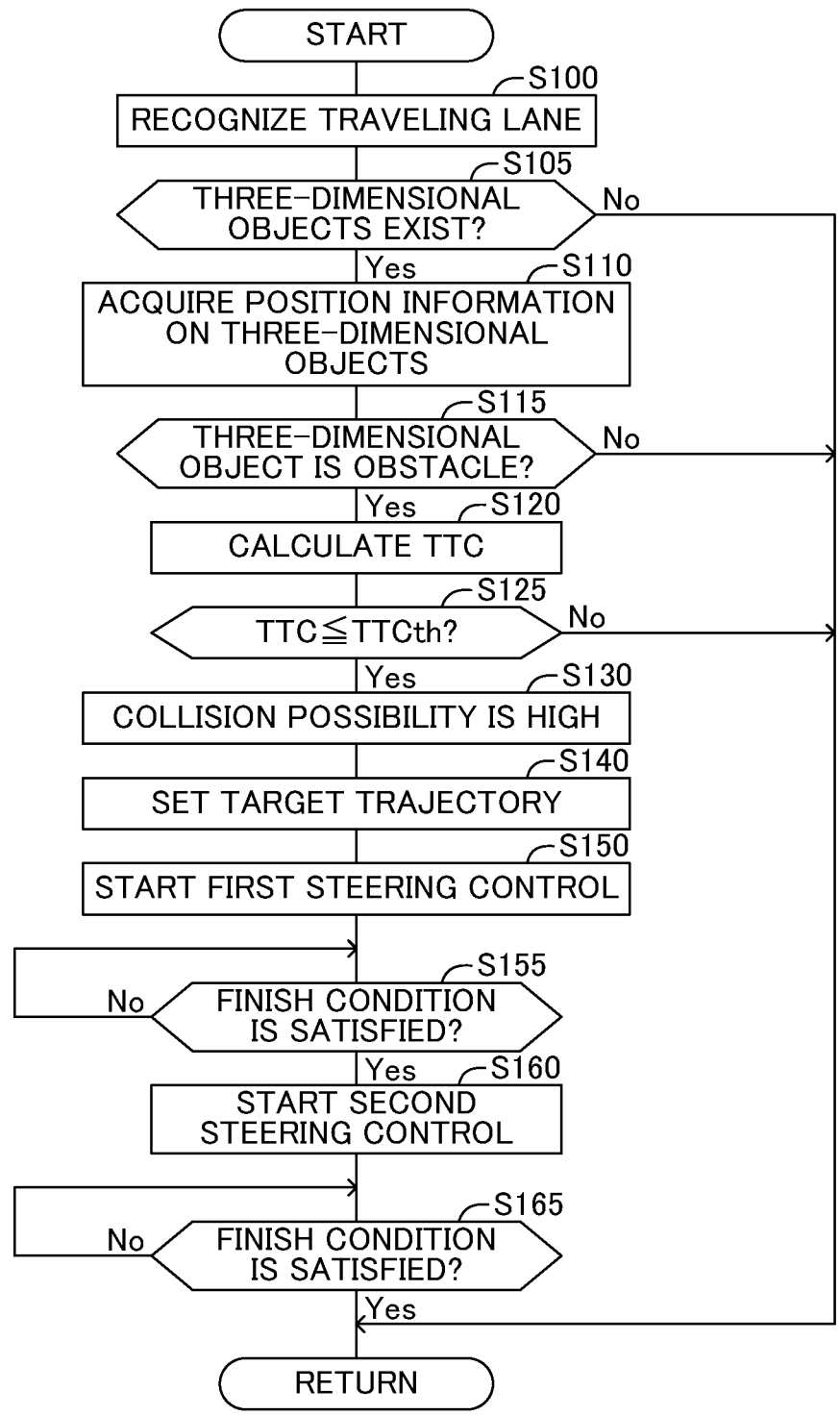
FIG. 7 is a flowchart for illustrating a routine of processing of the collision avoidance control in the at least one embodiment.

Now, referring to a flowchart of FIG. 7, description is given of a routine of processing of the collision avoidance control executed by the driving assistance ECU 10. The driving assistance ECU 10 repeatedly executes processing steps of Step S100 and subsequent steps of FIG. 7 at a predetermined cycle during the travel of the vehicle 100.

In Step S100, the driving assistance ECU 10 recognizes the traveling lane LA1 partitioned by the left white line WL and the right white line WR based on the position information on the left white line WL and the right white line WR transmitted from the periphery recognition device 30.

After that, in Step S105, the driving assistance ECU 10 determines whether or not three-dimensional objects exist in the region located on the front side and the front lateral sides of the own vehicle 100 based on the target information transmitted from the periphery recognition device 30. When three-dimensional objects exist (Yes), the driving assistance ECU 10 advances the process to Step S110. Meanwhile, when three-dimensional objects do not exist (No), the driving assistance ECU 10 temporarily finishes this routine (returns).

In Step S110, the driving assistance ECU 10 acquires the position information on the three-dimensional objects. After that, in Step S115, the driving assistance ECU 10 determines whether or not each three-dimensional object is an obstacle OB which is likely to collide with the own vehicle 100. When the own vehicle 100 is likely to collide with the three-dimensional object, the driving assistance ECU 10 determines that this three-dimensional object is an obstacle OB. When the driving assistance ECU 10 determines that the three-dimensional object is an obstacle OB (Yes), the driving assistance ECU 10 advances the process to Step S120. Meanwhile, when the driving assistance ECU 10 determines that the three-dimensional object is not an obstacle OB (No), the driving assistance ECU 10 temporarily finishes this routine (returns).

In Step S120, the driving assistance ECU 10 calculates the TTC. After that, in Step S125, the driving assistance ECU 10 determines whether or not the TTC is equal to or shorter than the predetermined collision determination threshold value TTCth. When the TTC is equal to or shorter than the collision determination threshold value TTCth (Yes), the driving assistance ECU 10 advances the process to Step S130. Meanwhile, when the TTC is not equal to or shorter than the collision determination threshold value TTCth (No), the driving assistance ECU 10 temporarily finishes this routine (returns).

In Step S130, the driving assistance ECU 10 determines that the own vehicle 100 is highly likely to collide with the obstacle OB. After that, in Step S140, the driving assistance ECU 10 sets the target trajectory Rt which enables the own vehicle 100 to avoid the collision with the obstacle OB without deviating from the traveling lane LA1, and advances the process to Step S150. When the above-mentioned collision avoidance space SP1 (see FIG. 2) does not exist, and hence the driving assistance ECU 10 cannot set the target trajectory Rt, it is only required for the driving assistance ECU 10 to execute the collision avoidance control through braking control, which is not described in detail.

In Step S150, the driving assistance ECU 10 starts the automatic steering through the collision avoidance control. Specifically, the driving assistance ECU 10 starts the first steering control of executing the first incremental steering which increases the steering angle of the own vehicle 100 such that the own vehicle 100 avoids the obstacle OB while traveling along the target trajectory Rt. In Step S155, when the finish condition for the first steering control is satisfied, the driving assistance ECU 10 advances the process to Step S160. It is only required to set a point at which the steering angle starts to gradually decrease from the maximum value as an end point of the first steering control based on, for example, a profile of the steering angle obtained from the FF target steering torque $T_{FF}$.

In Step S160, the driving assistance ECU 10 starts the second steering control of increasing and decreasing the steering angle of the own vehicle 100 such that the own vehicle 100 is maintained within the traveling lane LA1 while traveling along the target trajectory Rt. Specifically, the first decremental steering of returning the steering angle incremented through the first steering control to the neutral position, the second incremental steering of incrementing the steering angle from the neutral position toward the opposite direction of the steering direction of the first steering control, and the second decremental steering of returning again the steering angle to the neutral position are successively executed. In Step S165, when the finish condition for the second steering control is satisfied, the driving assistance ECU 10 temporarily finishes this routine (returns). It is only required that the second steering control be finished, for example, when the yaw angle of the vehicle 100 is substantially parallel with the traveling lane LA1 (white lines WL and WR) or when the actual steering angle θs falls within a desired angle range.

Figure 8:
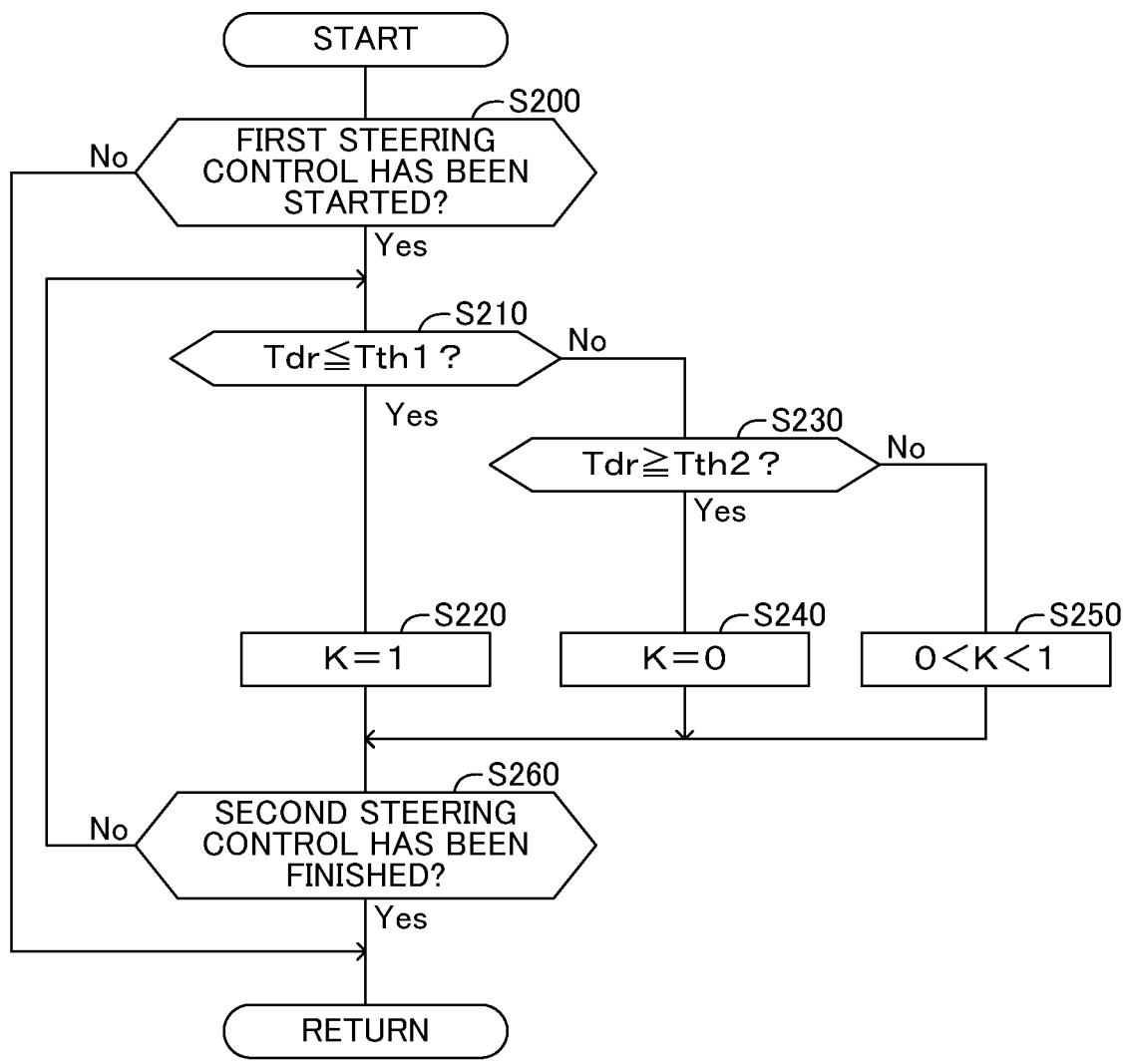
FIG. 8 is a flowchart for illustrating a routine of processing of cancellation torque control in the at least one embodiment.

Next, referring to a flowchart of FIG. 8, description is given of a routine of processing of the cancellation torque control executed by the driving assistance ECU 10. The driving assistance ECU 10 repeatedly executes the cancellation torque control of FIG. 8 in parallel with the routine of FIG. 7 during the travel of the vehicle 100.

In Step S200, the driving assistance ECU 10 determines whether or not the first steering control has been started. When the first steering control has been started (Yes), the driving assistance ECU 10 advances the process to Step S210. Meanwhile, when the first steering control has not been started (No), the driving assistance ECU 10 temporarily finishes this routine (returns).

In Step S210, the driving assistance ECU 10 determines whether or not the driver steering torque Tdr detected by the steering torque sensor 65 is equal to or lower than the first threshold torque Tth1. When the driver steering torque Tdr is equal to or lower than the first threshold torque Tth1 (Yes), the driving assistance ECU 10 advances the process to Step S220, sets the control gain K to "1," and applies the cancellation torque MA (=basic cancellation torque $T_{CA1}\times1$) which completely cancels the driver total torque $T_{SUM}$ (=Tdr+$T_{AS}$). As a result, the steering angle followability of the automatic steering can be increased. Meanwhile, when the driver steering torque Tdr is not equal to or lower than the first threshold torque Tth1 (No) in the determination of Step S210, the driving assistance ECU 10 advances the process to Step S230.

In Step S230, the driving assistance ECU 10 determines whether or not the driver steering torque Tdr detected by the steering torque sensor 65 is equal to or higher than the second threshold torque Tth2. When the driver steering torque Tdr is equal to or higher than the second threshold torque Tth2 (Yes), the driving assistance ECU 10 advances the process to Step S240, and sets the control gain K to "0." That is, the driving assistance ECU 10 does not apply the cancellation torque $T_{CA}$. As a result, when the driver has the steering intention, it is possible to effectively prevent the steering operation of the driver from being interfered with. Meanwhile, when the driver steering torque Tdr is not equal to or higher than the second threshold torque Tth2 (No) in the determination of Step S230, the driving assistance ECU 10 advances the process to Step S250.

In Step S250, the driving assistance ECU 10 sets the control gain K such that the control gain K decreases as the driver steering torque Tdr increases within the range in which the control gain K is larger than "0" and smaller than "1" (0<K<1). That is, the driving assistance ECU 10 gradually reduces the control gain K as the driver steering torque Tdr increases. As a result, it is possible to effectively prevent the steering operation of the driver from being greatly interfered with while the decrease in steering angle followability of the automatic steering is suppressed.

When the driving assistance ECU 10 advances the process from Step S220, Step S240, or Step S250 to Step S260, the driving assistance ECU 10 determines whether or not the second steering control has been finished. When the second steering control has been finished (Yes), the driving assistance ECU 10 temporarily finishes this routine (returns). Meanwhile, when the second steering control has not been finished (No), the driving assistance ECU 10 returns the process to the determination of Step S210. That is, until the automatic steering through the collision avoidance control is finished, the driving assistance ECU 10 repeatedly executes the processing steps of Step S210 to Step S260 described above.

As described in detail above, the driving assistance ECU 10 in the at least one embodiment sets, when an obstacle OB which is highly likely to collide with the own vehicle 100 is detected in the region located on the front side and the front lateral sides of the own vehicle 100, the target trajectory Rt which enables the own vehicle 100 to avoid the collision with the obstacle OB without deviating from the traveling lane LA1, and executes the automatic steering of controlling the steering angle of the steered wheels of the own vehicle 100 such that the own vehicle 100 travels along the target trajectory Rt. The driving assistance ECU 10 successively executes, as the automatic steering, the first steering control for avoiding the collision between the own vehicle 100 and the obstacle OB and the second steering control for preventing the own vehicle 100 from deviating from the traveling lane LA1. Moreover, during the execution of the automatic steering, the driving assistance ECU 10 applies the cancellation torque $T_{CA}$ which cancels the driver total torque $T_{SUM}$ (=Tdr+$T_{AS}$) obtained by summing the driver steering torque Tdr generated through the holding operation or the steering operation of the driver and the assist torque $T_{AS}$ generated in accordance with the driver steering torque Tdr. As a result, during the execution of the automatic steering through the collision avoidance control, an increase in steering angle followability that the actual steering angle θs substantially matches the target steering angle θt is achieved. As a result of the increase in the steering angle followability, the collision between the own vehicle 100 and the obstacle OB can reliably be avoided in the first steering control, and the own vehicle 100 can reliably be maintained within the traveling lane LA1 in the second steering control.

[Others]

In the above, the driving assistance device, the driving assistance method, and the program according to the at least one embodiment have been described, but the present disclosure is not limited to the above-mentioned at least one embodiment, and various modifications are possible within the range not departing from the object of the present disclosure.

Modification Example 1

Figure 9:
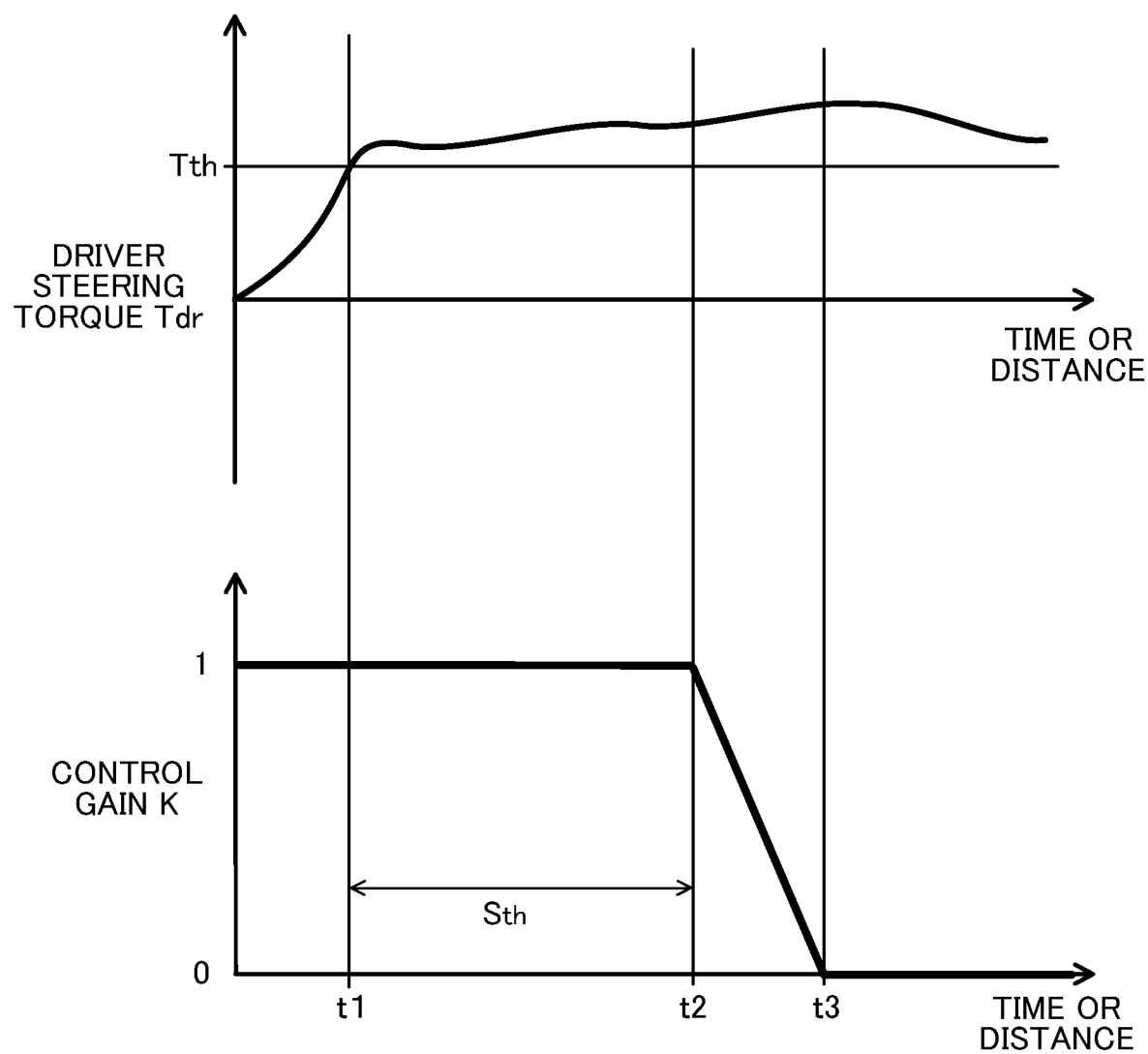
FIG. 9 is a schematic graph for showing Modification Example 1.

In Modification Example 1, as shown in FIG. 9, when a state in which the driver steering torque Tdr detected by the steering torque sensor 65 is equal to or higher than a predetermined threshold torque Tth continues for a predetermined threshold time Sth (or a threshold distance) or longer (see a time t1 to a time t2) during the execution of the automatic steering, the driving assistance ECU 10 determines that the driver has the steering intention, and gradually reduces the control gain K from "1" to "0." Meanwhile, the driving assistance ECU 10 maintains the setting of the control gain K at "1" when the state in which the driver steering torque Tdr is equal to or higher than the threshold torque Tth does not continue for the predetermined threshold time Sth or longer or when the driver steering torque Tdr is lower than the threshold torque Tth.

When the control gain K is to be gradually reduced from "1" to "0," it is preferred to set a gradual reduction time (see the time t2 to a time t3) in which a reduction amount of the control gain K per unit time is limited in order to prevent a sudden change in driver steering torque Tdr. It is only required to set the gradual reduction time such that the gradual reduction time becomes longer as the driver steering torque Tdr increases. A combination of the threshold torque Tth and the threshold time Sth is not limited to one pattern, and a plurality of patterns may be set, such as a pattern in which the threshold time Sth is short when the threshold torque Tth is high, and the threshold time Sth is long when the threshold torque Tth is low.

As described above, when the state in which the driver steering torque Tdr is equal to or higher than the threshold torque Tth continues for the threshold time Sth or longer, it is possible to effectively prevent the interference with the steering operation of the driver when the driver has the steering intention by gradually reducing the control gain K from "1" to "0." Moreover, when the state in which the driver steering torque Tdr is equal to or higher than the threshold torque Tth does not continue for the threshold time Sth or longer, or when the driver steering torque Tdr is lower than the threshold torque Tth, it is possible to effectively prevent the decrease in steering angle followability of the automatic steering under the state in which the driver aimlessly holds the steering wheel SW by maintaining the setting of the control gain K at "1."

Modification Example 2

Figure 10:
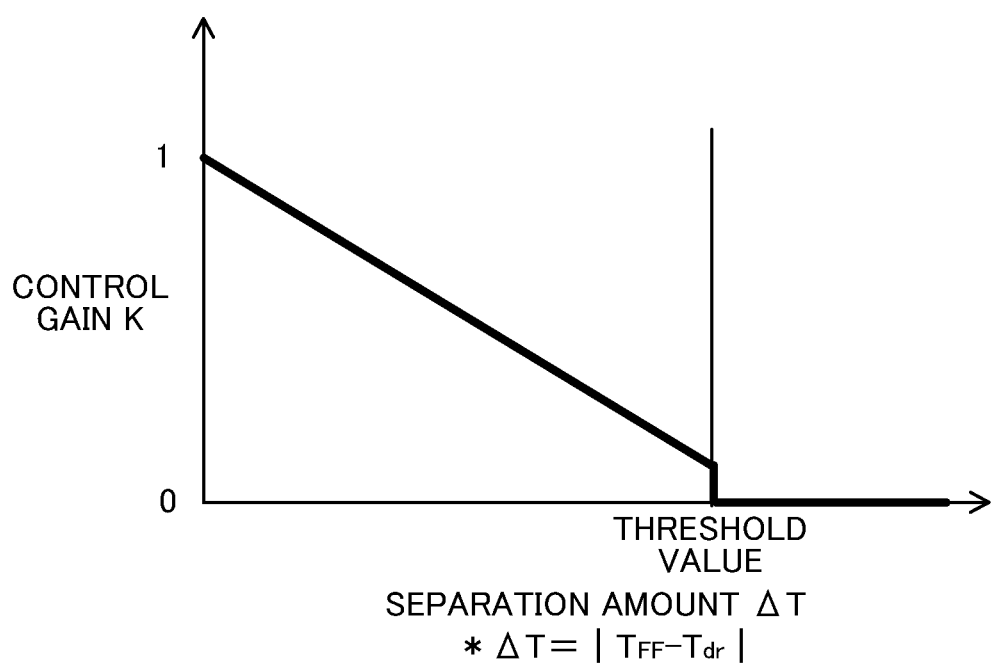
FIG. 10 is a schematic graph for showing Modification Example 2.

In Modification Example 2, as shown in FIG. 10, the driving assistance ECU 10 sets, based on an absolute value of a separation amount $\Delta T$ ($=T_{FF}$-Tdr) between the FF target steering torque $T_{FF}$ of the automatic steering and the driver steering torque Tdr detected by the steering torque sensor 65, the control gain K such that the control gain K decreases as the separation amount $\Delta T$ (absolute value) increases. Specifically, when the separation amount $\Delta T$ is equal to or smaller than a predetermined threshold value, the control gain K is gradually reduced as the separation amount $\Delta T$ increases. When the separation amount $\Delta T$ exceeds the threshold value, the control gain K is set to "0."

As described above, it is possible to apply an optimal cancellation torque $T_{CA}$ corresponding to the strength (degree) of the steering intention of the driver by gradually reducing the control gain K as the separation amount $\Delta T$ between the FF target steering torque $T_{FF}$ and the driver steering torque Tdr increases. As a result, when the steering intention of the driver is strong, it is possible to effectively prevent the steering operation of the driver from being greatly interfered with. When the steering intention of the driver is weak, it is possible to effectively prevent the steering angle followability of the automatic steering from being greatly reduced. The separation amount $\Delta T$ may be a difference between the target steering torque Tt ($=T_{FF}+T_{FB}$) and the driver steering torque Tdr.

Modification Example 3

In Modification Example 2 described above, even when the separation amount $\Delta T$ between the FF target steering torque $T_{FF}$ and the driver steering torque Tdr is equal to or smaller than the threshold value, when the state in which the FF target steering torque $T_{FF}$ and the driver steering torque Tdr are separated from each other continues for a predetermined threshold time or longer, the driving assistance ECU 10 may determine that the driver has the steering intention, and may gradually reduce the control gain K to "0." In this case, when the control gain K is to be gradually reduced to "0," as in Modification Example 1 described above, it is preferred to set the gradual reduction time in which the reduction amount of the control gain K per unit time is limited in order to prevent the sudden change in driver steering torque Tdr.

As described above, when the state in which the FF target steering torque $T_{FF}$ and the driver steering torque Tdr are separated from each other continues for the threshold time or longer, it is possible to effectively prevent the steering operation of the driver from being interfered with after the steering intention of the driver becomes clear by gradually reducing the control gain K to "0". Moreover, it is possible to effectively prevent the steering angle followability of the automatic steering from decreasing until the steering intention of the driver becomes clear by applying the cancellation torque $T_{CA}$ based on the control gain K until the state in which the FF target steering torque $T_{FF}$ and the driver steering torque Tdr are separated from each other continues for the threshold time or longer.

Modification Example 4

Figure 11:
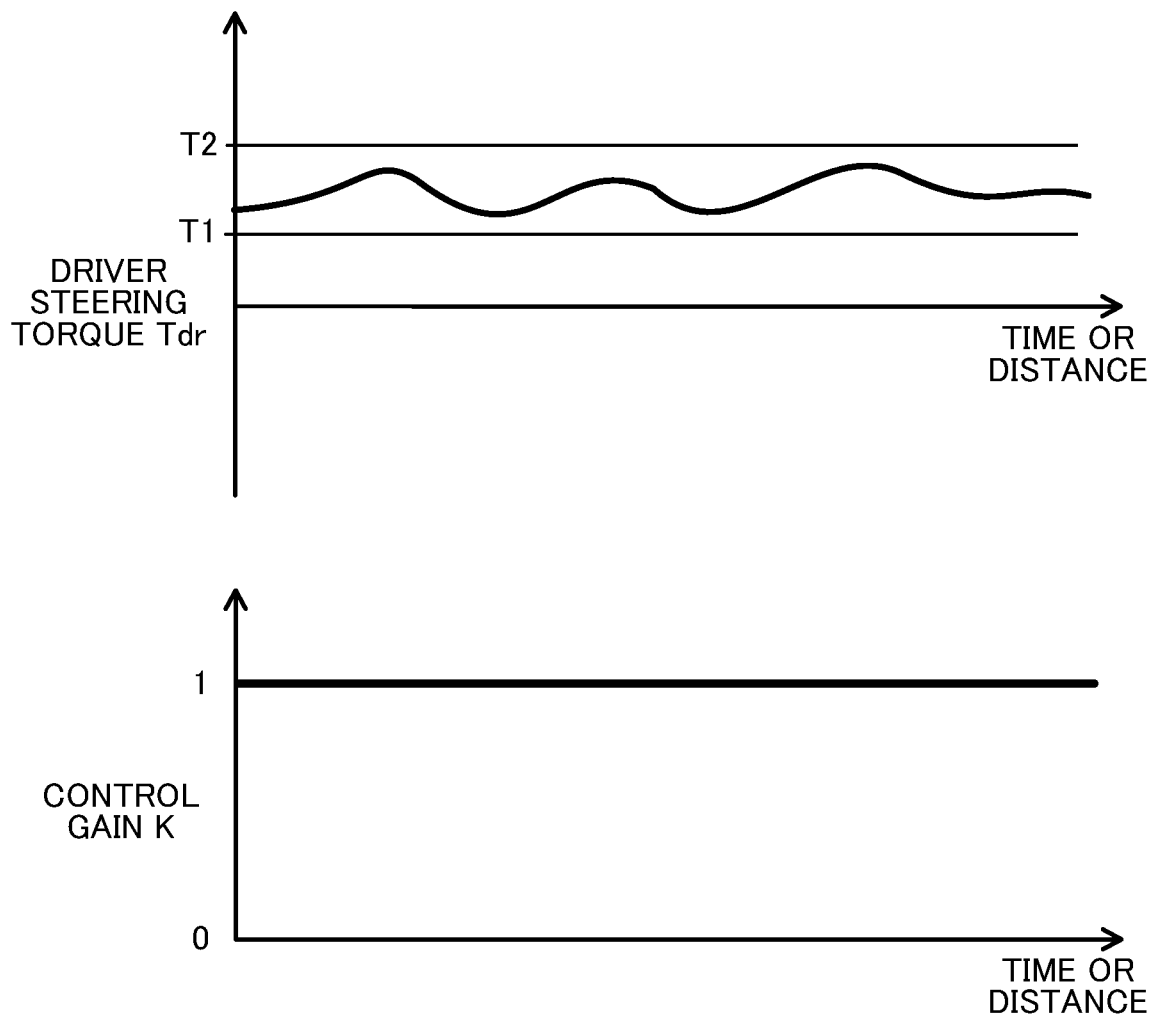
FIG. 11 is a schematic graph for showing Modification Example 4.

The state in which the driver aimlessly holds the steering wheel SW can be determined also based on a periodic change (fluctuation) in driver steering torque Tdr. As shown in FIG. 11, when the driver steering torque Tdr detected by the steering torque sensor 65 repeatedly changes to increase and decrease within a predetermined torque range of from T1 to T2, it is estimated that the direction of the steering of the driver is not determined. In this case, the driving assistance ECU 10 determines that the driver aimlessly holds the steering wheel SW, and maintains the setting of the control gain K at "1."

As described above, it is possible to effectively increase the steering angle followability of the automatic steering by determining the driving state in which the driver aimlessly holds the steering wheel SW based on the periodic change of the increase and the decrease in driver steering torque Tdr, and maintaining the setting of the control gain K at "1" in a period in which it is determined that the driver aimlessly holds the steering wheel SW.

Modification Example 5

In the at least one embodiment and Modification Examples 1 to 4 described above, the presence or absence of the steering intention of the driver and the like are determined based on the driver steering torque Tdr detected by the steering torque sensor 65. However, the steering torque sensor 65 detects a high reverse torque which is in the opposite direction of that of the FF target steering torque $T_{FF}$ generated through steering inertia and the holding operation of the driver immediately after a start of the automatic steering (first steering control) through the collision avoidance control. When the presence or absence of the steering intention of the driver and the like are determined based on the detection result including such a reverse torque, an erroneous determination may be caused.

In Modification Example 5, the driving assistance ECU 10 does not make the determination based on the detection result of the steering torque sensor 65 until a predetermined time has elapsed since the start of the first steering control. Specifically, the driving assistance ECU 10 executes the processing step of Step 205 of determining whether or not the elapsed time since the start of the first steering control has reached the predetermined time between Step S200 and Step S210 of the flow of FIG. 8 in the at least one embodiment. In this case, when the elapsed time has reached the predetermined time, it is only required to advance the process to Step S210. Moreover, in Modification Example 1 described above, the driving assistance ECU 10 starts the determination of whether or not the driver steering torque Tdr is equal to or higher than the predetermined threshold torque Tth when the predetermined time has elapsed since the start of the first steering control. Further, in Modification Example 2 and Modification Example 3 described above, the driving assistance ECU 10 calculates the separation amount ΔT between the FF target steering torque $T_{FF}$ and the driver steering torque Tdr when the predetermined time has elapsed since the start of the first steering control. Still further, in Modification Example 4 described above, the driving assistance ECU 10 starts the determination of whether or not the driver steering torque Tdr is changing to increase and decrease within the predetermined torque range of from T1 to T2 when the predetermined time has elapsed since the start of the first steering control. As described above, it is possible to effectively prevent the erroneous determination based on the reverse torque by starting the determination when the predetermined time has elapsed since the start of the first steering control.

What is claimed is:

1. A driving assistance device for executing collision avoidance control of controlling, when an obstacle which is highly likely to collide with an own vehicle is detected in a region located on a front side and front lateral sides of the own vehicle, a steering angle of the own vehicle so that the own vehicle travels along a target trajectory which enables the own vehicle to avoid the collision with the obstacle without deviating from a traveling lane, the driving assistance device comprising:
    a target steering torque setting unit configured to set a target steering angle required to cause the own vehicle to travel along the target trajectory, and to set a target steering torque for matching a steering angle of the own vehicle with the target steering angle under a state in which a driver steering torque generated through one of a holding operation or a steering operation of a steering wheel by a driver of the own vehicle is not generated;
    a cancellation torque setting unit configured to set a cancellation torque being a torque in a direction of canceling a total steering torque obtained by summing the driver steering torque and a steering assist torque set based on the driver steering torque; and
    a steering control unit configured to execute steering control of controlling the steering angle of the own vehicle based on a torque control amount obtained by adding the target steering torque to the cancellation torque.

2. The driving assistance device according to claim 1, wherein the cancellation torque setting unit includes:
    a basic cancellation torque setting unit configured to set a basic cancellation torque for completely canceling the total steering torque; and
    a gain setting unit configured to set a cancellation gain corresponding to a magnitude of the driver steering torque, and
    wherein the cancellation torque setting unit is configured to set the cancellation torque by multiplying the basic cancellation torque by the cancellation gain.

3. The driving assistance device according to claim 2, wherein the gain setting unit is configured to set the cancellation gain such that the cancellation gain decreases as the driver steering torque increases.

4. The driving assistance device according to claim 2, wherein the gain setting unit is configured to set the cancellation gain to 0 when a state in which the driver steering torque is equal to or higher than a predetermined threshold torque continues for a predetermined threshold time or longer.

5. The driving assistance device according to claim 2, wherein the gain setting unit is configured to set the cancellation gain such that the cancellation gain decreases as a separation amount between the target steering torque and the driver steering torque increases, and to set the cancellation gain to 0 when the separation amount exceeds a predetermined threshold value.

6. The driving assistance device according to claim 5, wherein the gain setting unit is configured to set the cancellation gain to 0 also when a state in which the separation amount is equal to or smaller than the predetermined threshold value continues for a predetermined threshold time or longer.

7. The driving assistance device according to claim 2, wherein the gain setting unit is configured to set the cancellation gain to 1 when the driver steering torque changes to increase and decrease within a predetermined torque range.

8. A driving assistance method of executing collision avoidance control of controlling, when an obstacle which is highly likely to collide with an own vehicle is detected in a region located on a front side and front lateral sides of the own vehicle, a steering angle of the own vehicle so that the own vehicle travels along a target trajectory which enables the own vehicle to avoid the collision with the obstacle without deviating from a traveling lane, the driving assistance method comprising:
- setting a target steering angle required to cause the own vehicle to travel along the target trajectory, and setting a target steering torque for matching a steering angle of the own vehicle with the target steering angle under a state in which a driver steering torque generated through one of a holding operation or a steering operation of a steering wheel by a driver of the own vehicle is not generated;
- setting a cancellation torque being a torque in a direction of canceling a total steering torque obtained by summing the driver steering torque and a steering assist torque set based on the driver steering torque; and
- executing steering control of controlling the steering angle of the own vehicle based on a torque control amount obtained by adding the target steering torque to the cancellation torque.

9. A non-transitory computer readable medium comprising a program for causing a computer of a driving assistance device for executing collision avoidance control of controlling, when an obstacle which is highly likely to collide with an own vehicle is detected in a region located on a front side and front lateral sides of the own vehicle, a steering angle of the own vehicle so that the own vehicle travels along a target trajectory which enables the own vehicle to avoid the collision with the obstacle without deviating from a traveling lane, to execute a process of:
- setting a target steering angle required to cause the own vehicle to travel along the target trajectory, and setting a target steering torque for matching a steering angle of the own vehicle with the target steering angle under a state in which a driver steering torque generated through one of a holding operation or a steering operation of a steering wheel by a driver of the own vehicle is not generated;
- setting a cancellation torque being a torque in a direction of canceling a total steering torque obtained by summing the driver steering torque and a steering assist torque set based on the driver steering torque; and
- executing steering control of controlling the steering angle of the own vehicle based on a torque control amount obtained by adding the target steering torque to the cancellation torque.

* * * * *